US005131227A

United States Patent [19]

Iseman

[11] Patent Number: 5,131,227

[45] Date of Patent: Jul. 21, 1992

[54] PRIORITY ARRANGEMENT AND METHOD FOR A FLUID HANDLING SYSTEM

[75] Inventor: Walter J. Iseman, Monroe Center, Ill.

[73] Assignee: Sundstrand Corporation, Rockford, Ill.

[21] Appl. No.: 543,379

[22] Filed: Jun. 26, 1990

[51] Int. Cl.[5] ........................ F16D 31/02

[52] U.S. Cl. ........................ 60/422; 60/327; 60/428; 60/486; 91/28; 91/33; 91/516

[58] Field of Search ................ 60/327, 421, 422, 428, 60/486, 456, 488; 91/33, 28, 516

[56] References Cited

U.S. PATENT DOCUMENTS

| | | | |
|---|---|---|---|
| 3,154,921 | 11/1964 | Junck et al. . | |
| 3,289,688 | 12/1966 | Malott | 60/430 X |
| 3,834,163 | 9/1974 | Wilke | 91/28 X |
| 3,962,872 | 6/1976 | Budzich | 60/456 X |
| 4,173,867 | 11/1979 | Schmidt et al. | 60/456 |
| 4,517,800 | 5/1985 | Karakama et al. | 91/516 X |
| 4,553,389 | 11/1985 | Tischer et al. | 60/430 X |
| 4,680,928 | 7/1987 | Nishikawa et al. . | |
| 4,819,430 | 4/1989 | Becker | 60/430 X |

*Primary Examiner*—Edward K. Look
*Assistant Examiner*—Todd Mattingly
*Attorney, Agent, or Firm*—Antonelli, Terry, Stout & Kraus

[57] ABSTRACT

A prioritizing method and arrangement for a hydraulic system including two independent hydraulic fluid supply units (4, 5) adapted to jointly and severally supply hydraulic fluid to at least two hydraulic components (2, 3). A cross-communication between the at lest two hydraulic components (2, 3) is controlled, with a flow of hydraulic fluid from one of the two hydraulic fluid supply units (5) being diverted to one of the at least two hydraulic components (3) to a substantial exclusion of the other of the at least two hydraulic components (2) in dependence upon an operating condition of the other of the two hydraulic fluid supplying units (5). A biasing force (F) acts upon the prioritizing arrangement so as to define an operating stage at which the respective hydraulic fluid supplying units (4, 5) exclusively supply hydraulic fluid to the respective ones of the at least two hydraulic units (2, 3).

21 Claims, 3 Drawing Sheets

PRIORITY ARRANGEMENT AND METHOD FOR A FLUID HANDLING SYSTEM

TECHNICAL FIELD

The present invention relates to a method and arrangement for a fluid handling system and, more particularly, to a method and arrangement for prioritizing a pump output of a dual pump system to ensure a sufficient fluid pressure supply to at least one of at least two components of a hydraulic system.

BACKGROUND OF THE INVENTION

In, for example, integrated drive generators (IDG's) and constant speed drives (CSD's) used, for example, in aircraft constructions, generally a dual pump arrangement is provided, with the pump arrangement including, for example, a centrifugal pump means for charge oil to hydraulic logs and supply pressure for a speed control function, and a positive displacement pump means for circulating oil through, for example, an external oil cooler, circulating oil filter, etc.

In, for example, U.S. Pat. No. 3,154,921, a dual positive displacement pump arrangement for a steering system is proposed, with the pumps respectively forming a fluid source and with a control valve arrangement being provided which is adapted to ensure a substantially constant volume of fluid supply when both pumps are in operation regardless of the speed of the drive source for the pumps.

U.S. Pat. No. 4,680,920 proposes a pump arrangement for an automatic transmission wherein a bypass passage is provided which branches off an outlet passage from a torque converter of the transmission at a position upstream of an oil cooler, with a bypass valve being associated with the bypass passage and being adapted to open the bypass passage during warming up of the automatic transmission to permit at least a portion of the oil discharged from the torque converter to be returned to an oil tank without passing through an oil cooler.

While the above proposed pump arrangements are more or less effective in providing a controlling function, neither of the pump arrangements provide for a priority diversion of hydraulic fluids handled in dependence upon an operating condition of one of the pumps nor provide any approach for regulating a flow from a centrifugal pump with a sharing of a flow from a centrifugal pump and a vane pump to separate hydraulic circuits in the hydraulic system.

DISCLOSURE OF THE INVENTION

The aim underlying the present invention essentially resides in providing an arrangement and method for prioritizing a fluid handling in a hydraulic system in response to an operating condition of a pump means of the fluid handling system in dependence upon an operating condition of the hydraulic system, with the method and arrangement avoiding, by simple means, the shortcomings and disadvantages encountered in the prior art.

In accordance with advantageous features of the present invention, a prioritizing arrangement is provided for prioritizing a flow of hydraulic fluid to at least one hydraulic component or unit of several hydraulic components or units of a hydraulic system supplied by at least two independent hydraulic supply means, with the prioritizing being effected in dependence upon at least one operating parameter of the hydraulic supply means so as to ensure a sufficient supply of a hydraulic fluid to a selected hydraulic component.

The prioritizing arrangement of the present invention controls a cross communication between the at least two hydraulic components or units and diverts the flow of hydraulic fluid of one of the fluid supply means to at least one of the hydraulic components or units to the substantial exclusion of the other hydraulic components or units in dependence upon an operating condition of the other of the fluid supply means.

By virtue of the prioritizing arrangement of the present invention, one of the hydraulic fluid supply means is adapted to supply hydraulic fluid to sensitive hydraulic components or units requiring a specific hydraulic fluid supply during a transitional phase until such time as the other hydraulic fluid supply means is capable of meeting the hydraulic fluid needs of the sensitive hydraulic components or units.

The hydraulic supply means may, for example, include a constant speed centrifugal pump means and a fixed displacement pump means in the form of a vaned pump arranged in the hydraulic system, with the pump means being adapted to jointly or severally exclusively supply the hydraulic fluid to one or more of the hydraulic components during specific operational stages of the hydraulic system.

Advantageously, in accordance with the present invention, the hydraulic system may, for example, form a hydraulic system for electric power generating systems such as, for example, an IDG of an aircraft, with the hydraulic components including hydraulic logs, servo valves, etc. disposed in a hydraulic charge circuit, and cooler, filter, differential gear assembly, etc. disposed in a hydraulic fluid circuit.

The prioritizing means may, in accordance with the present invention, be fashioned as a valve arrangement interposed between the centrifugal pump means and displacement pump means and the charge circuit and hydraulic fluid circuit, respectively, with the valve means being normally biased into a first position preventing communication between the centrifugal pump means and charge circuit until the occurrence of a predetermined pressure sufficient to overcome the biasing force acting on the valve means, which biasing force defines a point in time or stage of operation of the hydraulic system at which the centrifugal pump means and the fixed displacement pump means respectively exclusively supply the charge circuit and the hydraulic fluid circuit.

The valve means of the present invention functions to create a backpressure at an outlet of the centrifugal pump means whereby, by properly selecting the value of the biasing force, a preset pressure level is provided representing a threshold pressure at which the blocked communication between the centrifugal pump means and the charge circuit is opened to enable the centrifugal pump means to supply hydraulic fluid to the charge circuit.

The valve means may, in accordance with the present invention, be fashioned, for example, as a spool valve configured such that, in the first position, the fixed displacement pump means exclusively supplies the hydraulic fluid to the hydraulic charge circuit of the hydraulic system and, upon a build-up of the backpressure, a displacement of the spool valve results in a communication being established between the fixed displacement pump means and both the hydraulic fluid circuit and the hydraulic charge circuit, with the latter communication being established just prior to the communication between the centrifugal pump means and the charge circuit being opened.

By virtue of the blocking of the communication between the centrifugal pump means and the charge circuit until the pressure is built-up to the threshold pressure, it is possible to utilize a churning action of the hydraulic fluid by the centrifugal means during an initial start-up of the IDG to impart heat to the oil resulting in a more rapid decrease in a viscosity of the hydraulic fluid and subsequent pressure build-up thereby enabling a realization of more manageable levels of viscosity of the hydraulic fluid.

In accordance with the method of the present invention, hydraulic fluid is supplied to hydraulic components of a hydraulic system by independent hydraulic fluid supplying means, at least one of the hydraulic components is selected to be supplied with hydraulic fluid in all operating stages of the hydraulic system, and hydraulic fluid is supplied to the selected hydraulic component to the exclusion of the remaining components by one of the independent hydraulic fluid supplying means in dependence upon at least one operating parameter of the other of the independent hydraulic fluid supplying means.

The above and other objects, features, and advantages of the present invention will become more apparent from the following description when taken in connection with the accompanying drawings which show, for the purpose of illustration only, one embodiment in accordance with the present invention.

BEST MODE FOR CARRYING OUT THE INVENTION

Figure 1:
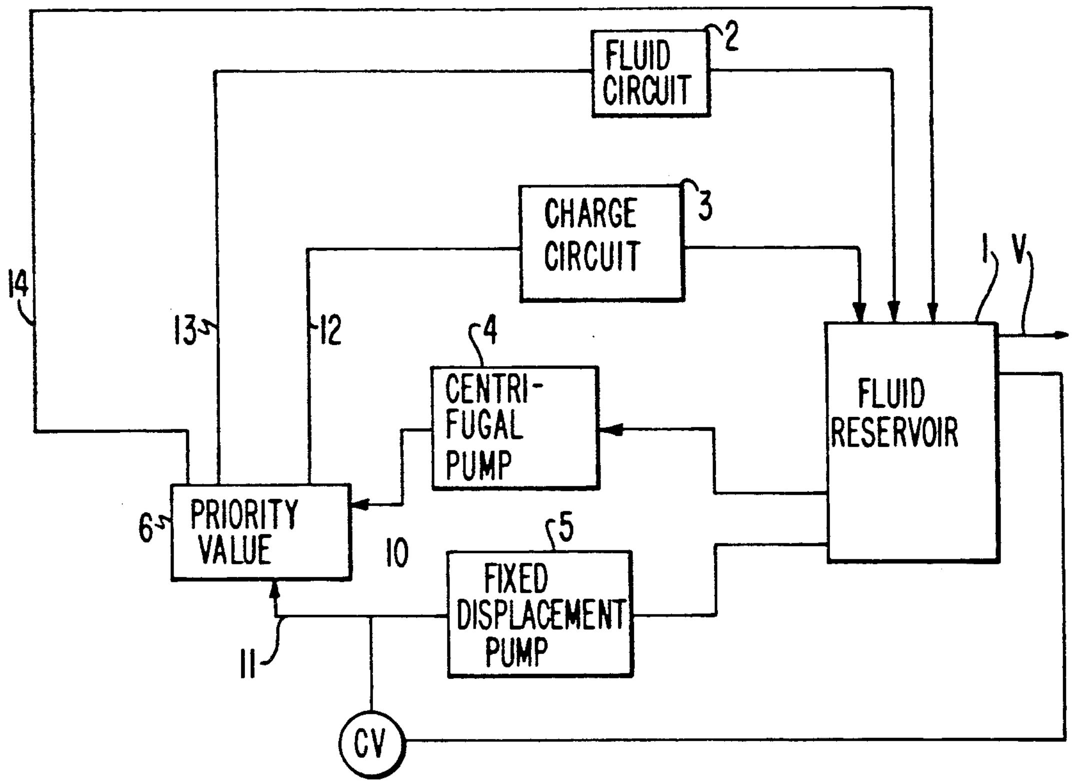
FIG. 1 is a schematic view of a hydraulic system including a dual pump arrangement incorporating a prioritizing means constructed in accordance with the present invention.

Referring now to the drawings wherein like reference numerals are used throughout the various views to designate like parts and, more particularly, to FIG. 1, according to this figure, a hydraulic system, for example, for a power generating system such as, for example, an IDG for aircraft, includes a fluid reservoir 1 for accommodating a hydraulic fluid, a centrifugal pump means 4 and a fixed displacement pump means 5 such as, for example, a vaned pump, with the centrifugal pump means 4 and fixed displacement pump means 5 being adapted to draw hydraulic fluid from the fluid reservoir 1 and supply the same to a charge circuit means 3 including, for example, hydraulic logs, servo valves, etc. (not shown), and to a lubricating or hydraulic fluid circuit including, for example, filter, cooler, servo valves, differential gear assembly, etc. (not shown), normally found in a conventional IDG.

A prioritizing means in the form of a priority valve 6 is interposed between the respective centrifugal pump means 4 and fixed displacement pump means 5 and the charge circuit means 3 and fluid circuit means 2 for controlling a flow of hydraulic fluid supplied from the discharge or outlet ports (not shown) of the respective centrifugal and fixed displacement pump means 4, 5 to the charge circuit means 3 and fluid circuit means 2. A hydraulic vent line 14 communicates the valve 6 and fluid reservoir 1, with the fluid reservoir 1 being vented to the atmosphere by a conventional vent means V. A conventional check valve CV is arranged in a hydraulic fluid line 11 communicating the fluid reservoir with a hydraulic fluid supply line 11 from the fixed displacement pump means 5.

Figure 2:
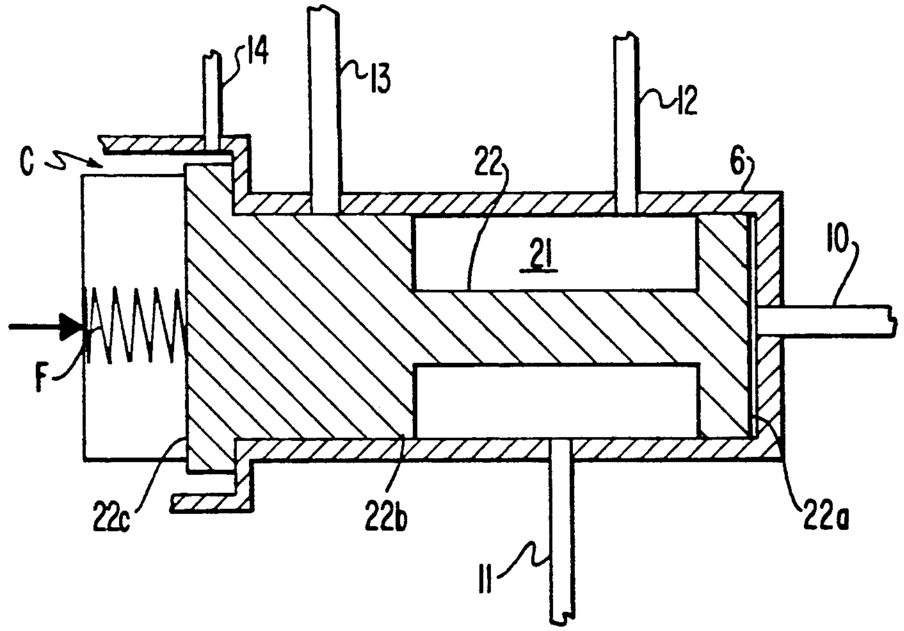
FIG. 2 is a longitudinal cross-sectional schematic view, on an enlarged scale, of the prioritizing means of the present invention in a first position.
Figure 3:
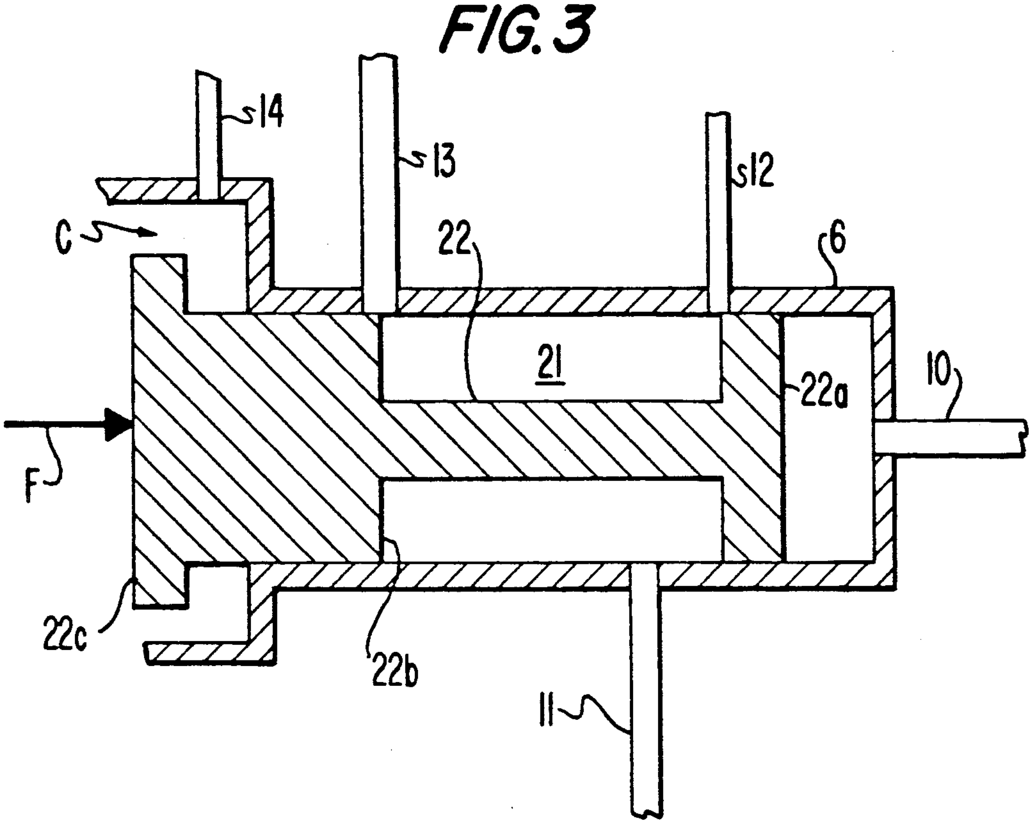
FIG. 3 is a longitudinal cross-sectional schematic view, on an enlarged scale, of the prioritizing means of the present invention in an intermediate position.
Figure 4:
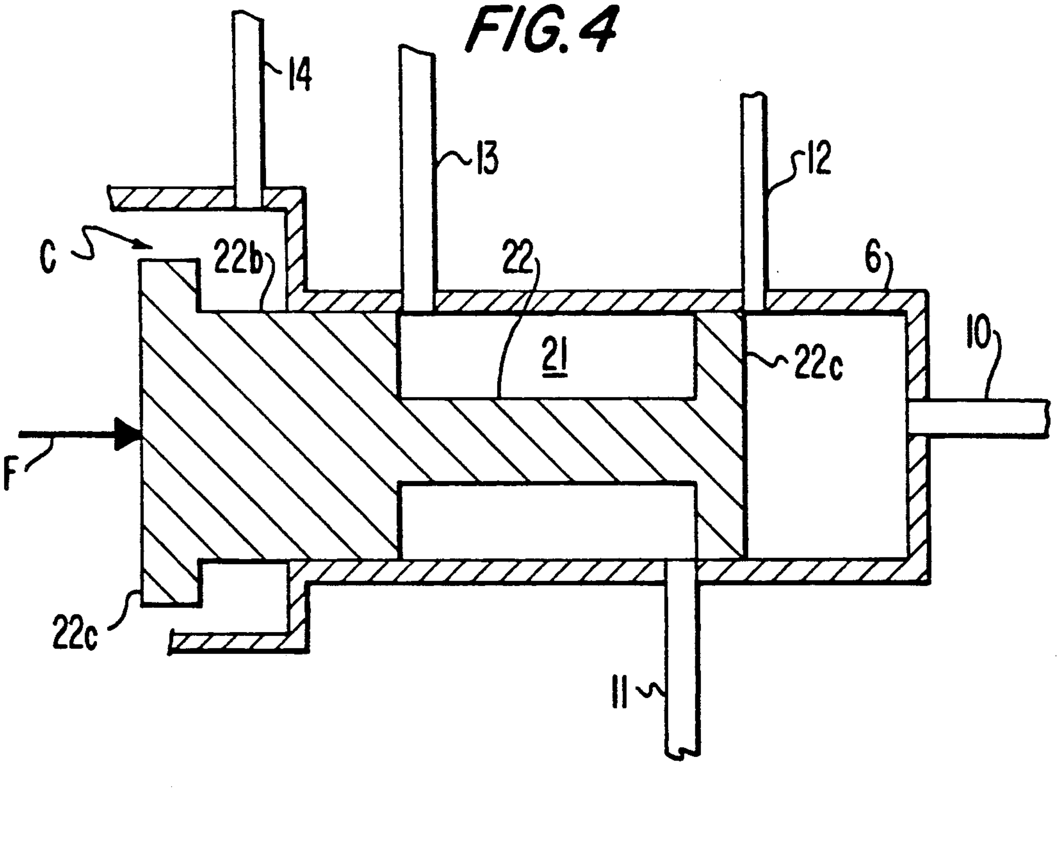
FIG. 4 is a longitudinal cross-sectional schematic view, on an enlarged scale, of the prioritizing means of the present invention in a third position.

As shown in FIGS. 2–4, the valve 6 includes a hydraulic fluid chamber displaceably accommodating a valve spool 22 provided with at least two axially spaced pistons *22a, 22b* having outer peripheral portions forming lands respectively adapted to control communication between the hydraulic fluid chamber and the centrifugal pump means 4, fixed displacement pump means 5, charge circuit means 3, and fluid circuit means 2 through hydraulic fluid lines 10, 11, 12, 13. A biasing force F is applied against the valve spool 22 so as to normally urge and maintain the valve spool 22 in a first position illustrated in FIG. 2. The biasing force F may be provided by, for example, spring means 24 such as compression springs or the like accommodated in a spring chamber generally designated by the reference character C of the valve 6 or the biasing force F may be applied by suitable conventional electromagnetic means (not shown). The spring chamber C is in communication with the fluid reservoir, through a hydraulic vent line 14. The biasing force F represents a threshold pressure which, upon being exceeded, results in the valve spool 22 being axially displaced by an amount dependent upon a fluid pressure acting on an end face of the piston *22a* facing the outlet port or opening of the hydraulic fluid line 10. An annular abutment *22c* is provided at an end of the valve spool 22 opposite the piston *22a* for defining a limiting means limiting axial displacement of the valve spool 22 to the illustrated position of FIG. 2.

In the illustrated position of FIG. 2, the valve spool 22 is positioned such that the fixed displacement pump means 5 is in communication with the charge circuit means 3 and communication between the centrifugal pump means 4 and the charge circuit means is essentially blocked.

The position of the valve spool 22 illustrated in FIG. 2 represents an initial or start-up position of the valve 6 and corresponds to a point in time or first operational stage when the output pressure of the centrifugal pump means 4 is insufficient to ensure an adequate hydraulic fluid supply to the sensitive components of the charge circuit means 3.

With the hydraulic fluid line 10 essentially blocked, pressure in the centrifugal pump means 4 will build up and act upon the piston *22a* so as to displace the valve spool 22 in a direction opposite to the biasing force F, with the valve spool 22 passing through an intermediate stage such as illustrated in FIG. 3, in which stage, the hydraulic fluid line 13 is opened to communicate the fluid circuit means 2 with the fixed displacement pump means 5 at a point in time just prior to the hydraulic fluid line 12 being closed or blocked from communication with the hydraulic fluid line 11. In other words, the hydraulic fluid line 13 opens before the hydraulic fluid line 12 closes; therefore, after a very slight movement of the valve spool 22 toward the left of the figures in response to a pressure rise in the hydraulic fluid line 10, the fixed displacement pump means 5 provides hydraulic fluid to both hydraulic fluid lines 12, 13 until the pressure in the hydraulic fluid line 10 builds up to a sufficient magnitude to move the valve spool 22 to the left to assume the position illustrated in FIG. 4 in a second operational stage of the hydraulic system, wherein the hydraulic fluid line 10 is in communication with the hydraulic fluid line 12 leading to the charge circuit means 3. After the valve spool 22 has moved toward the left to the position illustrated in FIG. 4, the centrifugal pump means 4 provides the hydraulic fluid at a relatively constant preset pressure to the charge circuit means 3 while the fixed displacement pump means 5 provides the necessary flow to the fluid circuit means 2.

With the hydraulic fluid line 10 being essentially blocked with the valve spool 22 in the positions illustrated in FIGS. 2 and 3, the pressure in the centrifugal pump means 4 eventually reaches the threshold pressure which will overcome the biasing force F so as to move the valve spool 22 toward the position illustrated in FIG. 4. Prior to the movement of the valve spool 22, the centrifugal pump means 4 continues to churn the hydraulic fluid within the housing thereof and impart heat to the hydraulic fluid thereby resulting in the hydraulic fluid slowly decreasing in viscosity and resulting in a pressure rise in the hydraulic fluid line 10.

Figure 5:
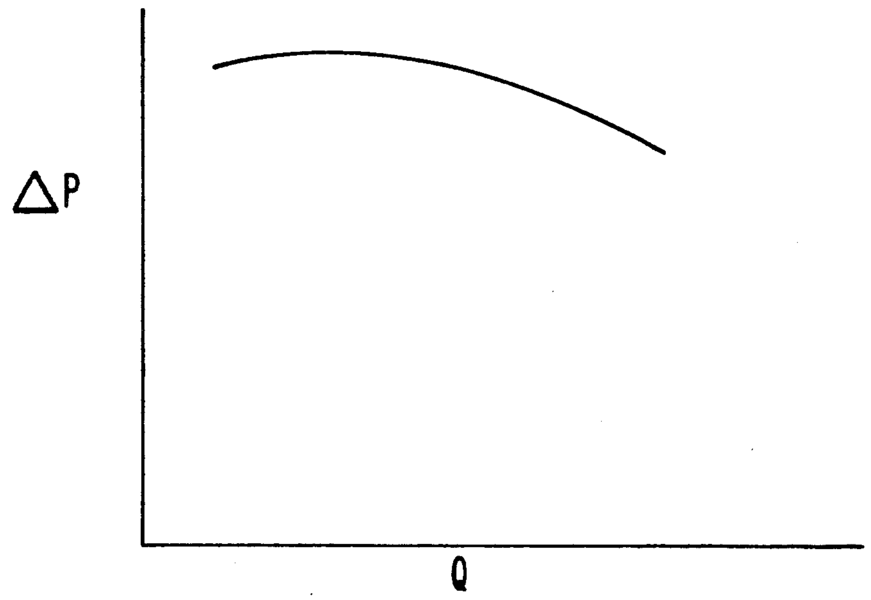
FIG. 5 is a graphical illustration of a pressure relationship for a typical low specific speed centrifugal pump.
Figure 6:
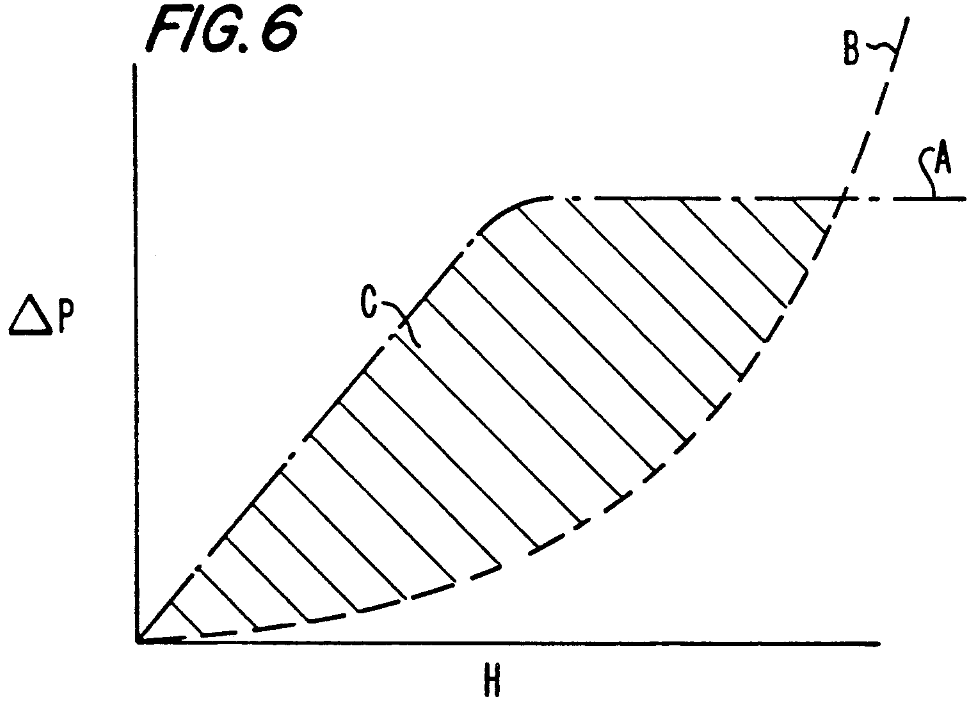
FIG. 6 is a graphical illustration of operating characteristics of a centrifugal pump and a fixed displacement pump.

FIG. 5 provides a graphical illustration of a relationship between the pressure differential $\Delta P$ and discharge Q of a typical low specific speed centrifugal pump means 4 obtained by the arrangement of the present invention in, for example, a 24K power generating system and, as shown in FIG. 6, wherein the curves A, B respectively represent the operating characteristics of a fixed displacement pump means 5 and a centrifugal pump means 4, with the valve 6 of the present invention, it is possible to compensate for the cross-hatched area C between the curves A and B when the $\Delta P$ is insufficient for the charge circuit means 3 and control. During this period of time, the fixed displacement pump means 5 is effective to ensure the sufficient supply of hydraulic fluid to the necessary sensitive components of the hydraulic system.

In accordance with the prioritizing method of the present invention, a hydraulic system is provided including at least two independent hydraulic fluid supplying means respectively adapted to supply hydraulic fluid to at least one of at least two hydraulic components of the hydraulic system, with one of the at least two hydraulic components having a priority over the remaining hydraulic components with respect to being supplied with hydraulic fluid to at least a partial exclusion of the remaining hydraulic components. A threshold pressure is preset, with the threshold pressure determining a point in time at which the hydraulic fluid from the hydraulic fluid supplying means is supplied to the respective components from both of the hydraulic fluid supplying means thereby ensuring a sufficient supply of hydraulic fluid to the selected hydraulic component during all operating phases of the hydraulic system.

The hydraulic fluid supplying means may include a fixed displacement pump means and a centrifugal pump means, with the threshold pressure being set by a prioritizing valve means thereby enabling a dual use of a centrifugal pump means and a fixed displacement pump means in combination with each other and in combination with the prioritizing valve means which regulates the flow from the centrifugal pump means and shares the flow from the centrifugal pump means and the vane pump means to, for example, hydraulic charge circuits and hydraulic fluid circuits of a power generating system such as, for example, an IDG.

While I have shown and described only one embodiment in accordance with the present invention, it is understood that the same is not limited thereto but is susceptible to numerous changes and modifications as known to one of ordinary skill in the art, and I therefore do not wish to be limited to the details shown and described herein, but intend to cover all such modifications as are encompassed by the scope of the appended claims.

I claim:

1. A prioritizing arrangement in a hydraulic system including first and second independent hydraulic fluid supplying means adapted to jointly or severally supply hydraulic fluid to at least two hydraulic units of the hydraulic system with one of the at least two hydraulic units having a priority over the remaining hydraulic units with respect to being supplied with hydraulic fluid to at least a partial exclusion of the remaining hydraulic units, the prioritizing arrangement including means arranged between the first and second hydraulic fluid supplying means and the at least two hydraulic units for controlling a flow of hydraulic fluid supplied from the first and second hydraulic fluid supplying means to said hydraulic units such that in a first operational stage of the hydraulic system fluid flow is permitted from one of the first and second hydraulic fluid supplying means to at least the one of the hydraulic units having a priority over the remaining hydraulic units while fluid flow from the other of the first and second hydraulic fluid supplying means is essentially blocked whereas in a second operational stage of the hydraulic system the flow of hydraulic fluid from the one of the first and second hydraulic fluid supplying means is diverted from the one of the at least two hydraulic units having a priority to at least one of the remaining hydraulic units and fluid flow is permitted from the other of the first and second hydraulic fluid supplying means to the one of the hydraulic units having a priority, said first and second operational stages of the hydraulic system being a function of an operating condition of the other of said first and second hydraulic fluid supplying means.

2. A prioritizing arrangement according to claim 1, wherein the operating condition is an output pressure of said other of said first and second hydraulic fluid supplying means.

3. A prioritizing arrangement according to claim 2, wherein said one of said first and second hydraulic fluid supplying means includes a fixed displacement pump means.

4. A prioritizing arrangement according to claim 3, wherein said other of said first and second hydraulic fluid supplying means includes a centrifugal pump means.

5. A prioritizing arrangement according to claim 4, wherein said at least two hydraulic units include a hydraulic fluid charge circuit and a hydraulic fluid lubrication cooling circuit.

6. A prioritizing arrangement according to claim 5, wherein said means for controlling includes a valve means arranged between the centrifugal pump means, the fixed displacement pump means, the hydraulic fluid charge circuit, and the hydraulic fluid lubrication circuit.

7. A prioritizing arrangement according to claim 6, wherein said means for controlling includes a biasing means for normally biasing said valve means into a first position in said first operational stage essentially blocking a communication between said centrifugal pump means and the hydraulic fluid charge circuit.

8. A prioritizing arrangement according to claim 7, wherein said biasing means includes a spring adapted to act on one end of the valve means to urge the same into said first position.

9. A prioritizing arrangement according to claim 7, wherein said valve means includes a valve spool disposed in a hydraulic chamber means for receiving hydraulic fluid from said centrifugal pump means and said fixed displacement pump means, said valve spool including means blocking a communication between said fixed displacement pump means and said hydraulic lubricating circuit when said valve means is in said first position whereby said fixed displacement pump means exclusively supplies hydraulic fluid to the hydraulic fluid charge circuit.

10. A prioritizing arrangement according to claim 9, wherein said means blocking is constructed such that the fixed displacement pump means supplies hydraulic fluid to both the hydraulic fluid charge circuit and the hydraulic lubricating circuit at a position intermediate the first position of the valve means and a further position of the valve means in said second operational stage wherein the communication between the centrifugal pump means and the hydraulic fluid charge circuit means is opened.

11. A prioritizing arrangement according to claim 10, wherein said fixed displacement pump means supplies hydraulic fluid exclusively to said hydraulic lubricating circuit when said valve means is in said further position.

12. A prioritizing arrangement according to claim 1, wherein the hydraulic system is arranged in a power generating system.

13. A prioritizing arrangement according to claim 12, wherein the power generating system is an IDG.

14. A prioritizing arrangement according to claim 1, wherein said means for controlling includes a valve means for selectively blocking a communication between said other of said first and second hydraulic supply means and the at least two hydraulic units in said first operational stage of the hydraulic system.

15. A prioritizing arrangement according to claim 14, wherein said means for controlling includes biasing means for normally biasing said valve means into a position in which the communication between said other of said first and second hydraulic supplying means and the at least two hydraulic units is blocked.

16. A prioritizing arrangement according to claim 15, wherein said operating condition is an output pressure of said other of said first and second hydraulic fluid supplying means.

17. A prioritizing arrangement according to claim 16, wherein said at least two hydraulic units include a hydraulic charge circuit and a hydraulic lubricating cooling circuit of a power generating system.

18. A method of prioritizing a flow of hydraulic fluid from two independent hydraulic fluid supplying means to at least two hydraulic units, the method comprising the steps of controlling a cross-communication between the at least two hydraulic units and the two hydraulic supplying means, and diverting a flow of hydraulic fluid from one of the two hydraulic fluid supplying means exclusively to one of the at least two hydraulic units to a substantial exclusion of the other of the at least two hydraulic units in dependence upon operating conditions of the other of said two hydraulic fluid supplying means.

19. A method of prioritizing according to claim 18, wherein the step of controlling includes allowing said one of said two hydraulic fluid supplying means to supply hydraulic fluid to the at least two hydraulic units during at least a portion of an operating stage of the hydraulic system.

20. A method of prioritizing according to claim 19, wherein the operating condition of the other of said two hydraulic fluid supplying means is an output pressure thereof.

21. A method of prioritizing the flow of hydraulic fluid in a hydraulic system comprising first and second independent hydraulic fluid supplying means for supplying hydraulic fluid to at least two hydraulic units with one of the at least two hydraulic units having a priority over the remaining hydraulic units with respect to being supplied with hydraulic fluid to at least a partial exclusion of the remaining hydraulic units, the method comprising the steps of controlling the fluid supply between the first and second hydraulic fluid supplying means and the at least two hydraulic units such that during a first operational stage of the hydraulic system hydraulic fluid is flowed from one of the first and second hydraulic fluid supplying means to the one of the hydraulic units having a priority over the remaining hydraulic units while essentially blocking fluid flow from the other of the first and second hydraulic fluid supplying means, and in a second operational stage of the hydraulic system diverting the flow of hydraulic fluid from the one of the first and second hydraulic fluid supplying means to at least one other remaining hydraulic unit and flowing hydraulic fluid from the other of the first and second hydraulic fluid supplying means to the one of the hydraulic units having a priority, wherein said first and second operational stages are a function of an output pressure of said other of the first and second hydraulic fluid supplying means.

* * * * *